United States Patent
Fredriksson et al.

(10) Patent No.: US 11,061,134 B2
(45) Date of Patent: Jul. 13, 2021

(54) RADAR LEVEL GAUGE SYSTEM WITH IMPROVED FEED-THROUGH

(71) Applicant: Rosemount Tank Radar AB, Mölnlycke (SE)

(72) Inventors: Håkan Fredriksson, Linköping (SE); Magnus Ohlsson, Norsholm (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 419 days.

(21) Appl. No.: 16/000,218

(22) Filed: Jun. 5, 2018

(65) Prior Publication Data

US 2019/0369230 A1    Dec. 5, 2019

(51) Int. Cl.
    *G01S 13/88*   (2006.01)
    *G01F 23/284*  (2006.01)
    *G01S 7/282*   (2006.01)
    *G01S 7/35*    (2006.01)
    *H01Q 1/22*    (2006.01)

(52) U.S. Cl.
    CPC ............ *G01S 13/88* (2013.01); *G01F 23/284* (2013.01); *G01S 7/282* (2013.01); *G01S 7/35* (2013.01); *H01Q 1/225* (2013.01)

(58) Field of Classification Search
    CPC ............. G01S 13/88; G01S 7/282; G01S 7/35
    USPC ......................... 342/124, 173, 175
    See application file for complete search history.

(56) References Cited

U.S. PATENT DOCUMENTS

| | | | |
|---|---|---|---|
| 5,926,080 A | 7/1999 | Palan et al. | |
| 7,636,059 B1 * | 12/2009 | Edvardsson | ........ G01F 23/284 342/124 |
| 7,952,514 B2 | 5/2011 | Nilsson | |
| 8,223,066 B2 * | 7/2012 | Mouknatjou | ........... G01S 7/285 342/124 |
| 8,477,064 B2 | 7/2013 | Nilsson | |
| 8,688,279 B2 | 4/2014 | Nilsson | |
| 8,970,395 B2 | 3/2015 | Nilsson et al. | |
| 2002/0053238 A1 | 5/2002 | Fahrenbach et al. | |
| 2004/0173020 A1 | 9/2004 | Edvardsson | |

(Continued)

OTHER PUBLICATIONS

The Communication and European Search Report from European Patent Application No. 19176165.9, dated Nov. 5, 2019.

*Primary Examiner* — Bo Fan
(74) *Attorney, Agent, or Firm* — Westman, Champlin & Koehler, P.A.

(57) ABSTRACT

A radar level gauge system, comprising a transceiver; an antenna for radiating an electromagnetic transmit signal from the transceiver towards a surface of the product and for returning an electromagnetic reflection signal back towards the transceiver; a feed-through connecting the transceiver and the antenna; and processing circuitry coupled to the transceiver for determining the filling level based on a relation between the transmit signal and the reflection signal, wherein the feed-through comprises a waveguide arranged between the transceiver and the antenna to receive the transmit signal from the transceiver and guide the transmit signal towards the antenna in a guiding direction, the waveguide comprising an elongated plug arranged in a hollow conductor extending in the guiding direction, wherein the plug comprises a non-conductive sleeve member and a metallic plug member, the non-conductive sleeve member being sealingly joined to a portion of the hollow conductor and to the metallic plug member.

25 Claims, 9 Drawing Sheets

(56) References Cited

U.S. PATENT DOCUMENTS

2008/0134778 A1    6/2008  Osswald et al.
2014/0266864 A1    9/2014  Fredriksson
2015/0377678 A1*  12/2015  Edvardsson ........ G01F 23/0069
                                                        342/124

* cited by examiner

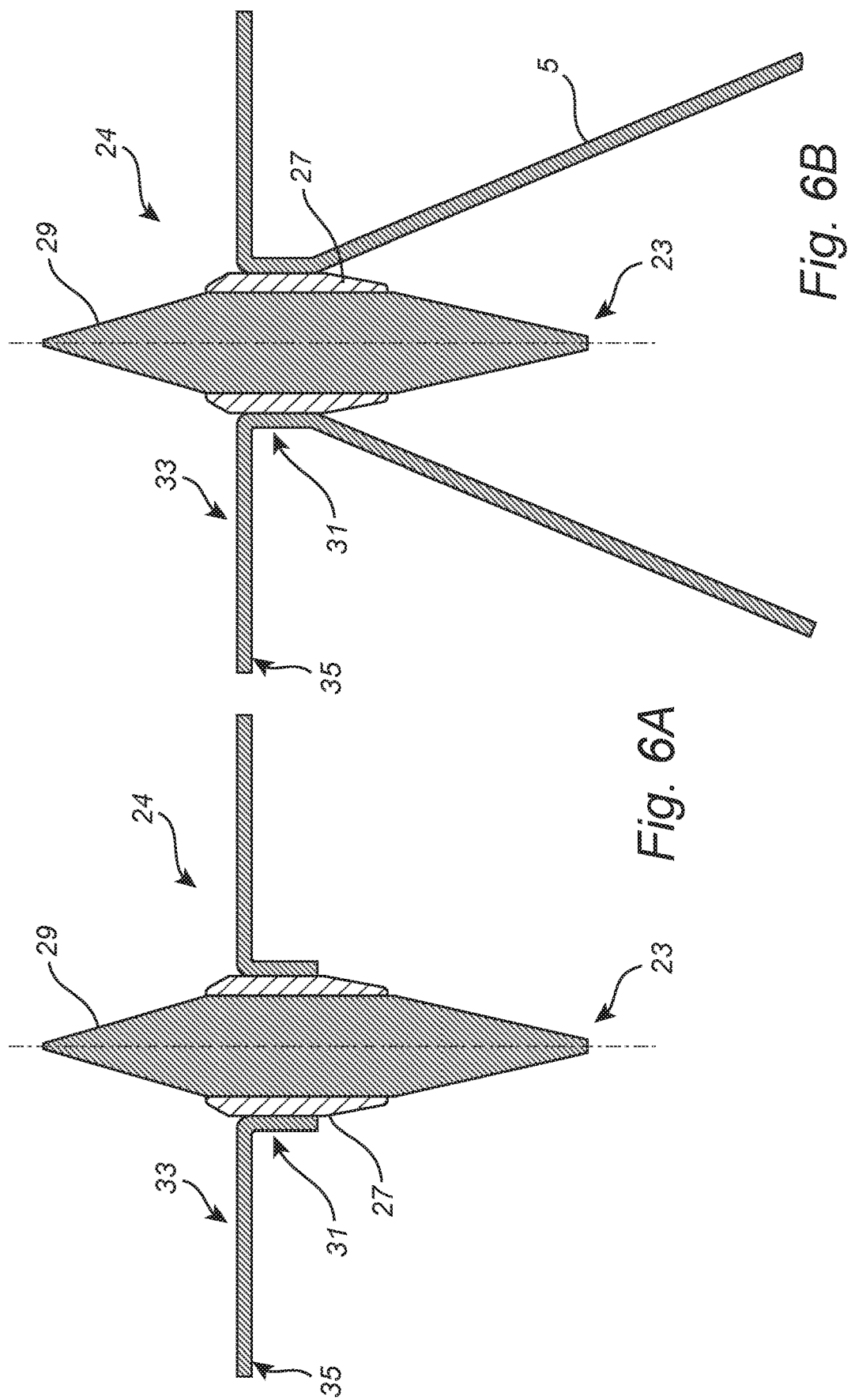

RADAR LEVEL GAUGE SYSTEM WITH IMPROVED FEED-THROUGH

TECHNICAL FIELD OF THE INVENTION

The present invention relates to a radar level gauge system and to a method of manufacturing a radar level gauge system.

TECHNICAL BACKGROUND

Radar level gauge (RLG) systems are in wide use for determining the filling levels of products in tanks. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank.

An electromagnetic transmit signal is generated by a transceiver and propagated towards the surface of the product in the tank, and an electromagnetic reflection signal resulting from reflection of the transmit signal at the surface is propagated back towards the transceiver.

Based on a relation between the transmit signal and the reflection signal, the distance to the surface of the product can be determined.

In some applications, non-contacting radar level gauge systems are used for measuring the filling level in tanks with high pressure and/or high temperature conditions inside the tank. In such applications, there are special requirements on, for example, parts of the radar level gauge system facing the interior of the tank.

For instance, US 2002/0053238 describes that microwave signals are coupled from a control unit to an antenna via a waveguide. To provide a sealing that is temperature resistant and pressure tight, US 2002/0053238 discloses that a ceramic waveguide filling is soldered into a solder sleeve along a solder seam.

Level gauging using high frequency non-contacting radar level gauge systems has several advantages, such as simplified installation, narrow beam angle, and longer measuring range. Modifying the configuration described in US 2002/0053238 to a high frequency, such as >20 GHz, would however result in a very narrow waveguide. With a typical ceramic waveguide filling, the diameter of the waveguide connecting the transceiver with the antenna may be as small as 3.5 mm or less.

With such a small diameter of the waveguide feeding the antenna, the risk of material (such as product or condensate) clogging up the antenna increases. Furthermore, such as narrow ceramic waveguide filling would be sensitive to handling, increasing the production cost and/or making operation and maintenance of the radar level gauge system more difficult and time-consuming.

SUMMARY OF THE INVENTION

In view of the above, a general object of the present invention is to provide an improved radar level gauge system, in particular an improved non-contacting high frequency radar level gauge system for applications with high temperature and/or high pressure inside the tank.

According to a first aspect of the present invention, it is therefore provided a radar level gauge system for determining the filling level of a product in a tank, comprising: a transceiver for generating, transmitting and receiving electromagnetic signals in a frequency range having a center frequency; an antenna for radiating an electromagnetic transmit signal from the transceiver towards a surface of the product and for returning an electromagnetic reflection signal resulting from reflection of the electromagnetic transmit signal at the surface back towards the transceiver; a feed-through connecting the transceiver and the antenna; and processing circuitry coupled to the transceiver for determining the filling level based on a relation between the transmit signal and the reflection signal, wherein the feed-through comprises a waveguide arranged between the transceiver and the antenna to receive the transmit signal from the transceiver and guide the transmit signal towards the antenna in a guiding direction, the waveguide comprising an elongated plug arranged in a hollow conductor extending in the guiding direction, wherein the plug comprises a non-conductive sleeve member and a metallic plug member, the non-conductive sleeve member being sealingly joined to a portion of the hollow conductor and to the metallic plug member.

That the non-conductive sleeve member is "sealingly joined" to a portion of the hollow conductor and to the metallic plug member should be understood to mean that the interfaces between the non-conductive sleeve member and the portion of the hollow conductor, and the metallic plug member, respectively, are gas tight. Advantageously, the interfaces may fulfil the requirements of applicable standards, such as the international standard IEC 60079-1.

The "portion" of the hollow conductor may constitute a fraction of the hollow conductor, or the entire hollow conductor.

The "transceiver" may be one functional unit capable of transmitting and receiving electromagnetic signals, or may be a system comprising separate transmitter and receiver units.

It should be noted that the processing circuitry may be provided as one device or several devices working together.

The electromagnetic transmit signal may advantageously be a microwave signal. For instance, the transmit signal may be frequency and/or amplitude modulated on a carrier in the microwave frequency range.

Examples of antennas include a horn antenna and a parabolic antenna, etc.

The present invention is based on the realization that a composite plug, including a metallic plug member, can be made with a substantially larger cross-section area than a conventional ceramic plug. For example, the lateral dimension (such as diameter for a circular cross-section) can be made about three times bigger. This reduces the risk of clogging, while retaining the desirable properties of conventional plugs.

According to embodiments, the non-conductive sleeve member may be arranged to electrically conductively separate the hollow conductor and the metallic plug member.

Advantageously, the electrically non-conductive sleeve member may be made of a ceramic material, such as $Al_2O_3$. One particularly suitable ceramic material may be so-called ZTA (zirconia toughened alumina). This material and other suitable ceramic materials are, per se, well known by those skilled in the relevant art. Alternatively, the electrically non-conductive sleeve member may be made of any other electrically non-conductive material that is capable of withstanding the intended operating conditions of the particular application, such as glass. Ceramic materials may, such as the above-mentioned ZTA may, however, be advantageous from a production point-of-view.

According to various embodiments, furthermore, an inner surface of the non-conductive sleeve member may be sealingly joined to the metallic plug member; and an outer surface of the non-conductive sleeve member may be sealingly joined to the portion of the hollow conductor. In embodiments, the non-conductive sleeve member may be shaped in such a way that the outer surface of the non-conductive sleeve member is sealingly joined to both the metallic plug member and the portion of the hollow conductor.

To provide for a desired increase in lateral dimensions (perpendicular to the guiding direction), a maximum dimension, in a direction perpendicular to the guiding direction, of the metallic plug member may be at least one half of a maximum dimension, in the direction perpendicular to the guiding direction, of the non-conductive sleeve member.

In various embodiments, the hollow conductor may have a substantially circular cross-section, in respect of a plane perpendicular to the guiding direction. In such embodiments, the non-conductive sleeve member may have an outer circular cross-section, at least in a portion thereof, that is accommodated by the hollow conductor, to facilitate a sealing joint between the outer surface of the non-conductive sleeve member and the surface of the hollow conductor portion. In this case, the above-mentioned maximum lateral dimensions may be diameters.

According to one example, for the center frequency of the transmit signal being about 26 GHz, the maximum diameter of the metallic plug member may be about 8 mm, and the maximum diameter of the non-conducting sleeve member (in this case a ceramic sleeve member) may be about 11 mm. For comparison, the maximum diameter of a conventional pure ceramic plug would be about 3.5 mm, for the center frequency of the transmit signal being about 26 GHz.

In embodiments, the non-conductive sleeve member may be sealingly joined to the metallic plug member in such a way that a physical or chemical bond is formed between the non-conductive sleeve member and the metallic plug member.

The non-conductive sleeve member may advantageously be joined to the metallic plug member by brazing, which is a, per se, well-known method of joining a dielectric, such as a ceramic, and metal.

Similarly, the non-conductive sleeve member may advantageously be joined to the portion of the hollow conductor by brazing.

According to various embodiments, the radar level gauge system may comprise: a first gauge part and a second gauge part joined to the first gauge part; and a metallic sealing member including: an inner circumferential portion constituting the above-mentioned portion of the hollow conductor; and an outer circumferential portion sealingly joined to the first gauge part.

In these embodiments, a sealing joint between the non-conductive sleeve portion and the portion of the hollow conductor can be achieved by sealingly joining the non-conductive sleeve portion and the metallic sealing member. The metallic sealing member may then be sealingly joined to the first gauge part.

Since the metallic sealing member can be made considerably smaller and lighter than the first gauge part, a sealing assembly can be rationally and conveniently formed using dedicated equipment for forming the sealing joint between the non-conductive sleeve member and the metallic sealing member. For instance, the non-conductive sleeve member and the inner circumferential portion of the metallic sealing member may advantageously be sealingly joined by brazing. During assembly of the radar level gauge system, the plug assembly may be sealingly joined to the first gauge part by sealingly joining the outer circumferential portion of the metallic sealing member and the first gauge part, advantageously through welding. The separation between the inner circumferential portion and the outer circumferential portion of the metallic sealing member may help reduce the risk of heat from the process of joining the plug assembly to the first gauge part from damaging the previously formed sealing joint between the non-conductive sleeve member and the inner circumferential portion of the metallic sealing member. In addition, the use of a separate metallic sealing member instead of directly brazing the non-conductive (such as ceramic) sleeve member to a more bulky gauge part provides for a reduction in stress on the relatively sensitive ceramic sleeve member due to differences in coefficients of thermal expansion between the metallic parts (typically made of stainless steel) and the ceramic sleeve member, during operation of the radar level gauge system.

It should be noted that various configurations of the metallic sealing member may be advantageous depending on application and other design considerations, as long as there is a separation between the inner circumferential portion and the outer circumferential portion. For instance, the inner circumferential portion and the outer circumferential portion may be in the same plane, or the inner circumferential portion and the outer circumferential portion may be offset from each other in the guiding direction.

By offsetting the inner circumferential portion and the outer circumferential portion from each other in the guiding direction, there may be more space available for sealingly joining the outer circumferential portion of the metallic plug member to the first gauge part, which may facilitate production of the radar level gauge system according to embodiments of the present invention. The above-mentioned reduction in thermal stress' ay also be further reduced.

Furthermore, either or both of the inner circumferential portion and the outer circumferential portion of the metallic sealing member may advantageously extend in the guiding direction.

One of the first gauge part and the second gauge part may be configured for attachment of the radar level gauge system to the tank. To reduce the risk of leakage from the tank, the first gauge part may advantageously be configured for attachment of the radar level gauge system to the tank, so that the joint between the outer circumferential portion and the first gauge part can be used to conveniently seal the tank when the radar level gauge system is installed.

To conveniently provide for the seal between the interior of the tank and the exterior of the tank, the metallic sealing member may advantageously be joined to the first gauge part by a weld, which may advantageously be a continuous weld. For instance, the weld may be formed by laser welding to a depth of at least 1 millimeter.

According to various embodiments, furthermore, the metallic plug member may comprise: a first pin part sealingly joined to the non-conductive sleeve member; and a second pin part attached to the first pin part in such a way that the second pin part is electrically conductively connected to the first pin part.

By providing the metallic plug member as two parts, there may be more space available for sealingly joining the outer circumferential portion of the metallic plug member to the first gauge part, which may facilitate production of the radar level gauge system according to embodiments of the present invention.

The first part of the metallic plug member of the elongated plug may face the antenna, and the second part of the metallic plug member of the elongated plug may face the transceiver.

The center frequency of the transmit signal may be higher than 20 GHz.

The antenna may be a horn antenna, and the non-conductive sleeve member and the metallic plug member may extend into the antenna.

According to a second aspect of the present invention, it is provided a method of manufacturing a radar level gauge system, comprising the steps of: providing a first gauge part; providing a second gauge part configured to be joined with the first gauge part; providing a sealing arrangement comprising: a metallic sealing member having an inner circumferential portion and an outer circumferential portion; and an elongated plug sealingly joined to the inner circumferential portion of the metallic sealing member; attaching the sealing arrangement to the first gauge part by sealingly joining the outer circumferential portion of the metallic sealing member to the first gauge part; and joining the first gauge part and the second gauge part.

It should be noted that the above steps need not necessarily be carried out in any particular order.

According to embodiments, the step of attaching may comprise welding the outer circumferential portion of the metallic sealing member to the first gauge part.

The welding in combination with the dielectric-metal seal between the non-conductive sleeve member and the metallic plug member and the inner circumferential portion, respectively, may provide zone separation through a so-called single seal. To provide for this, the welding step may provide a continuous weld that fulfills the requirements of an applicable standard, such as international standard IEC 60079-1 or similar standards.

According to various embodiments, the metallic plug member may comprise a first pin part sealingly joined to the non-conductive sleeve member; and a second pin part, and the method may further comprise the step of attaching the second pin part to the first pin part in such a way that the second pin part is conductively connected to the first pin part.

The step of attaching the second pin part to the first pin part may advantageously take place after the step of attaching the sealing arrangement to the first gauge member.

Further effects and variations of the present second aspect of the invention are largely similar to those described above with reference to the first aspect of the invention.

In summary, the present invention thus relates to a radar level gauge system, comprising a transceiver; an antenna for radiating an electromagnetic transmit signal from the transceiver towards a surface of the product and for returning an electromagnetic reflection signal back towards the transceiver; a feed-through connecting the transceiver and the antenna; and processing circuitry coupled to the transceiver for determining the filling level based on a relation between the transmit signal and the reflection signal, wherein the feed-through comprises a waveguide arranged between the transceiver and the antenna to receive the transmit signal from the transceiver and guide the transmit signal towards the antenna in a guiding direction, the waveguide comprising an elongated plug arranged in a hollow conductor extending in the guiding direction, wherein the plug comprises a non-conductive sleeve member and a metallic plug member, the non-conductive sleeve member being sealingly joined to a portion of the hollow conductor and to the metallic plug member.

BRIEF DESCRIPTION OF THE DRAWINGS

These and other aspects of the present invention will now be described in more detail, with reference to the appended drawings showing a currently preferred embodiment of the invention, wherein:

FIGS. 6A-C schematically illustrate other example configurations of the sealing arrangement;

DETAILED DESCRIPTION OF EXAMPLE EMBODIMENTS OF THE INVENTION

In the present detailed description, various embodiments of the radar level gauge system according to the present invention are mainly discussed with reference to a battery-powered radar level gauge system with wireless communication capabilities.

It should be noted that this by no means limits the scope of the present invention, which equally well includes, for example, radar level gauge systems that are not included in a process management system or radar level gauge systems that are loop-powered or powered with dedicated power lines.

Figure 1:
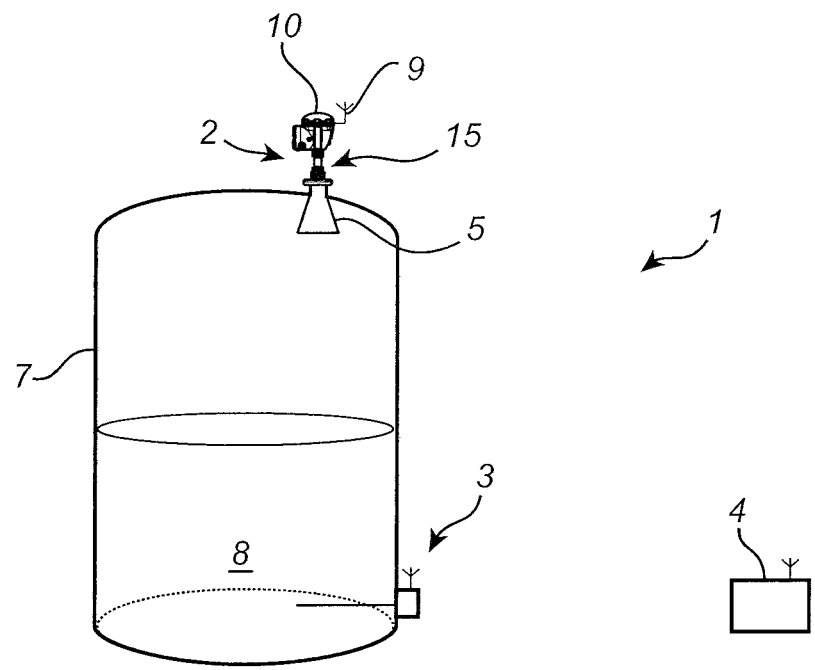
FIG. 1 schematically shows a process monitoring system comprising a radar level gauge system according to an example embodiment of the present invention.

FIG. 1 schematically shows a process monitoring system 1 comprising a plurality of field devices, including an example embodiment of a radar level gauge system 2 and a temperature sensing device 3 wirelessly connected to a host system 4. The radar level gauge system 2 comprises a measurement electronics unit 10 arranged outside the tank 7, an antenna 5 arranged inside the tank 7, and a feed-through 15 connecting the measurement electronics unit 10 with the antenna 5.

The radar level gauge system 2 and the temperature sensor 3 are both arranged on a tank containing a product 8 to be gauged.

To reduce the energy consumption of the radar level gauge system 2, at least parts of the radar level gauge system may be operated intermittently and energy may be stored during inactive or idle periods to be used during active periods.

Solutions for intermittent operation and energy storage are, for example, described in U.S. Pat. Nos. 7,952,514, 8,477,064 and 8,688,279, each of which is hereby incorporated by reference in its entirety.

Figure 2:
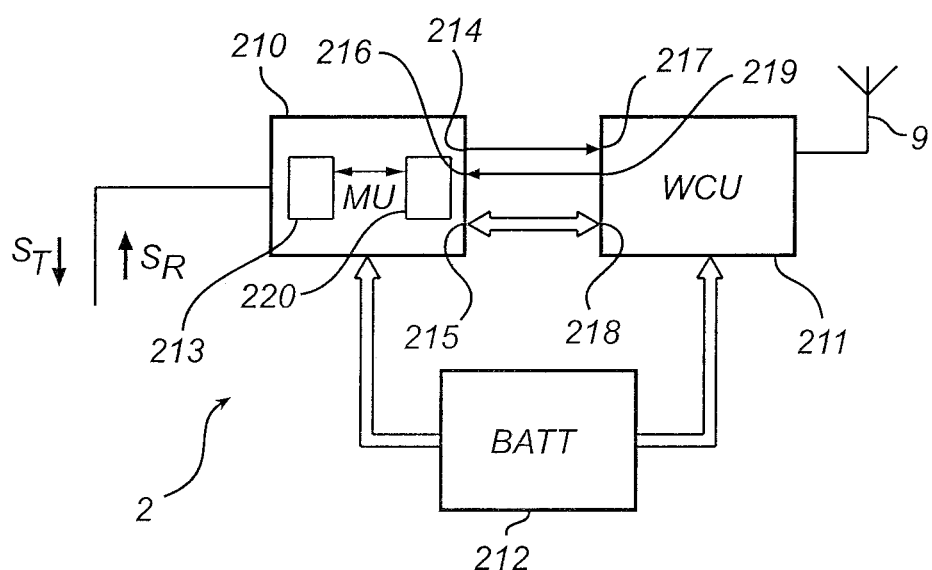
FIG. 2 is a block diagram schematically illustrating the radar level gauge system in FIG. 1.

With reference to FIG. 2, the radar level gauge system 2 in FIG. 1 comprises a measurement unit (MU) 210, a wireless communication unit (WCU) 211 and a local energy store in the form of a battery 212. The wireless communication unit 211 may advantageously be compliant with WirelessHART (IEC 62591). As is schematically indicated in FIG. 2, the MU 210 comprises a transceiver 213 and a measurement processor 220. The transceiver 213 is controllable by the measurement processor 220 for generating, transmitting and receiving electromagnetic signals having frequencies defining a frequency bandwidth, such as 24 GHz to 27 GHz. The measurement processor 220 is coupled to the transceiver 213 for determining the filling level in the tank 7 based on a relation between the transmit signal $S_T$ and the reflection signal $S_R$.

As is schematically indicated in FIG. 2, the measurement unit 210 comprises a first output 214, a second output 215, and a first input 216. The first output 214 is connected to a first input 217 of the wireless communication unit 211 through a first dedicated line, the second output 215 is connected to a second input 218 of the wireless communication unit 211, and the first input 216 is connected to a first output 219 of the wireless communication unit 211 through a second dedicated line. The second output 215 of the measurement unit 210 and the second input 218 of the wireless communication unit 211 may be configured to handle bidirectional data communication according to a serial or a parallel communication protocol to allow exchange of data between the measurement unit 210 and the wireless communication unit 211. The communication between the measurement unit 210 and the wireless communication unit 211 using the different inputs/outputs is described in more detail in U.S. Pat. No. 8,970,395, which is hereby incorporated by reference in its entirety.

The above example of a wireless and locally powered configuration is intended to give the skilled person a detailed example of how various aspects and embodiments of the radar level gauge system according to the present invention can be implemented. It should, however, be noted that there are many other ways of powering and interfacing a radar level gauge system. Such other ways are widely accessible to one of ordinary skill in the art and can be implemented without excessive experimentation or undue burden.

Figure 3:
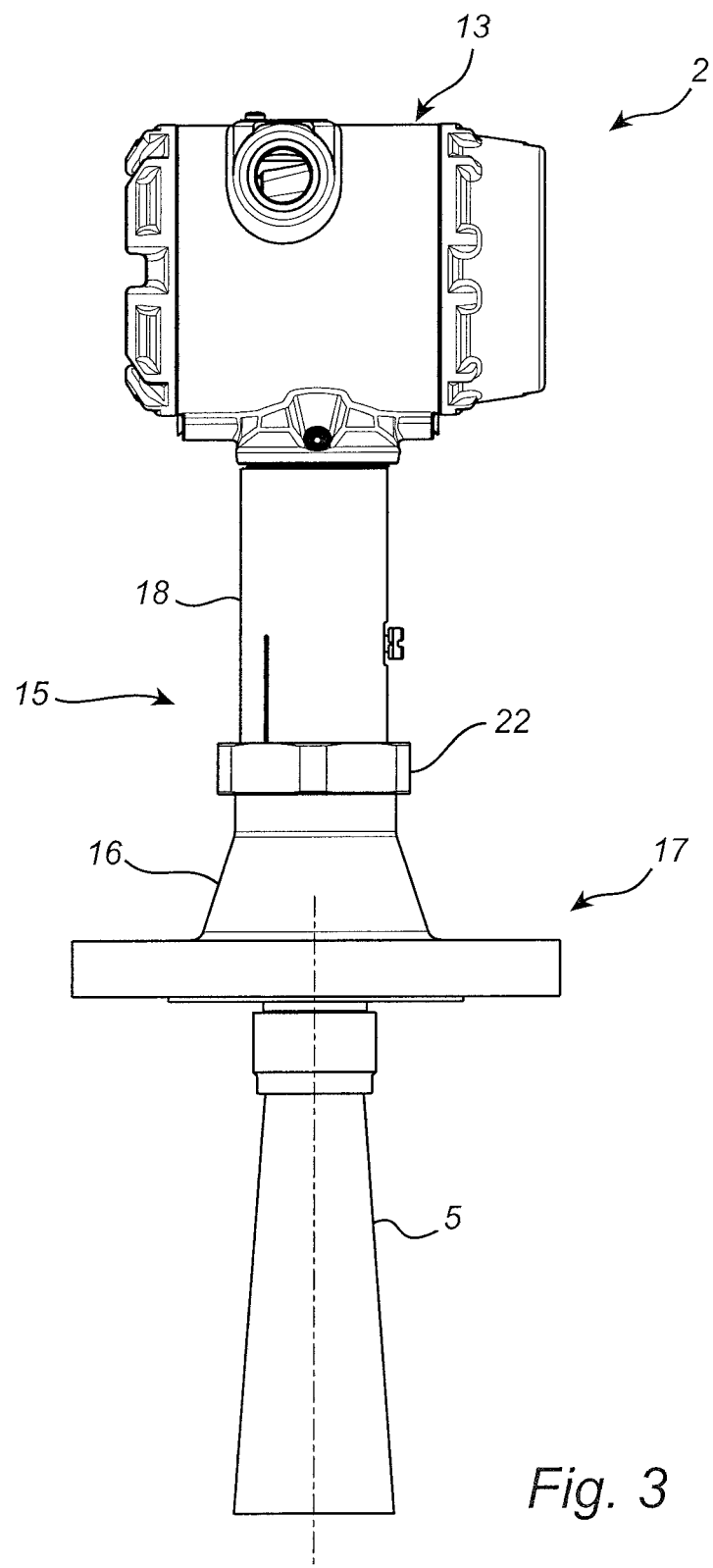
FIG. 3 is a schematic side view of the radar level gauge system in FIG. 1.

FIG. 3 is a side-view of the radar level gauge system 2 in FIG. 1. Referring to FIG. 3, the radar level gauge system 2 comprises measurement and communication unit 13, feed-through 15, process connection 17, and antenna 5. The process connection 17, here a flange, is provided for attaching the radar level gauge system to an opening provided in the tank 7, and the feed-through 15 connects the transceiver in the measurement and communication unit 13 with the antenna 5. As is schematically indicated in FIG. 3, the feed-through 15 is divided into a first gauge part 16 and a second gauge part 18, held together by nut 22. In this particular embodiment, the process connection 17 is provided by the flange included in the first gauge part 16.

For demanding application with high temperature and high pressure, sometimes referred to as HTHP-applications, there are severe requirements on the radar level gauge system 2, in particular on the feed-through 15. The feed-through 15 should allow the electromagnetic measurement signals to pass with as little damping and interference as possible, while withstanding high pressure, such as over 100 bar, at a high temperature, such as in excess of 300° C., without leakage or other damage.

Figure 4:
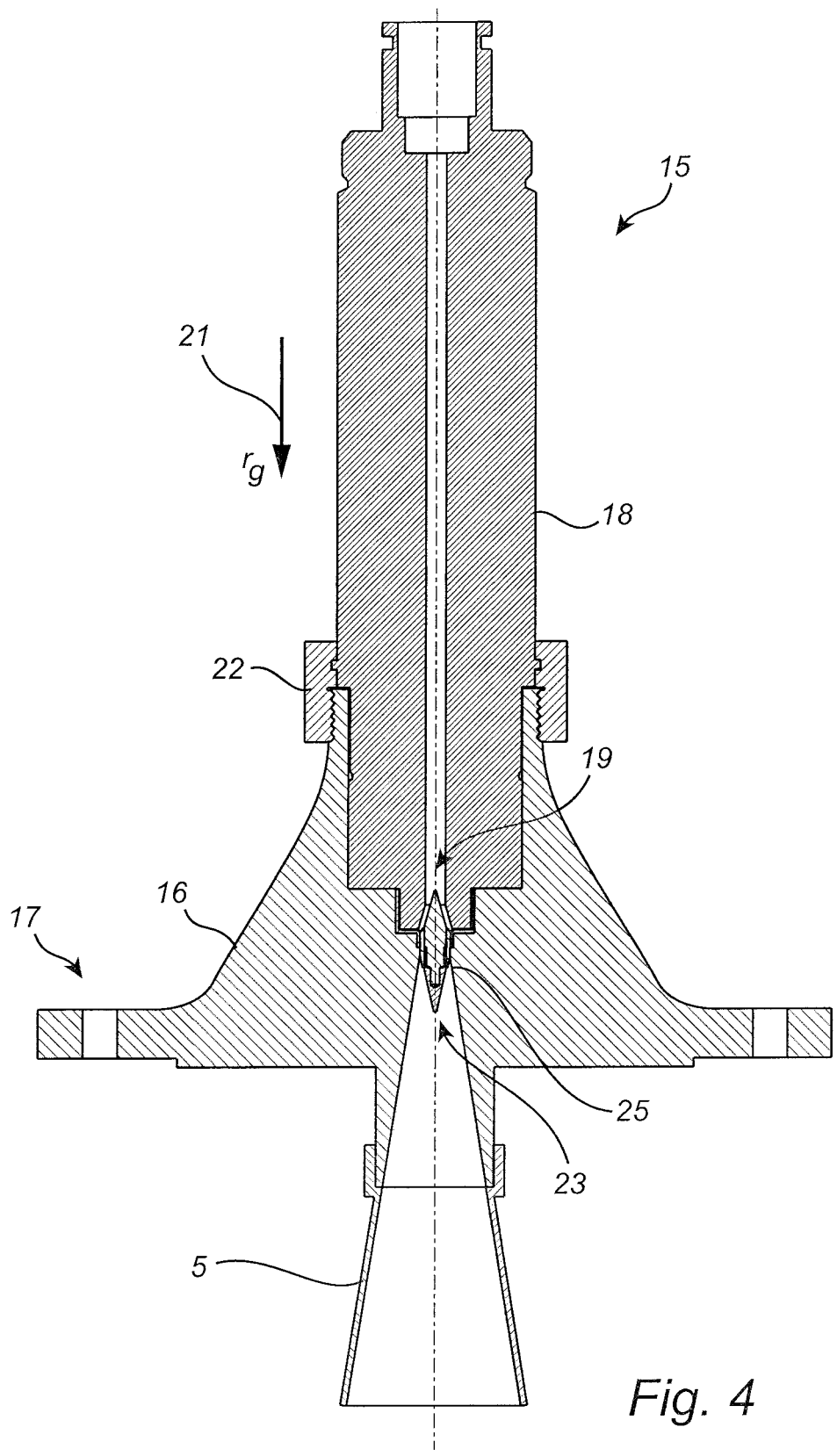
FIG. 4 is a cross-section view schematically illustrating the feed-through of the radar level gauge system in FIG. 3.

FIG. 4 is a partial cross-section view mainly illustrating the feed-through 15 comprised in an embodiment of the radar level gauge system 2 in FIG. 3. Referring to FIG. 4, the feed-through 15 comprises a waveguide 19 arranged between the transceiver (not shown in FIG. 4) and the antenna 5 to receive a transmit signal from the transceiver and guide the transmit signal towards the antenna 5 in a guiding direction $r_g$ (indicated by the arrow 21 in FIG. 4). As is schematically indicated in FIG. 4, the waveguide 19 comprises a sealing arrangement 24 including an elongated plug 23 arranged in a hollow conductor 25 extending in the guiding direction $r_g$.

Figure 5:
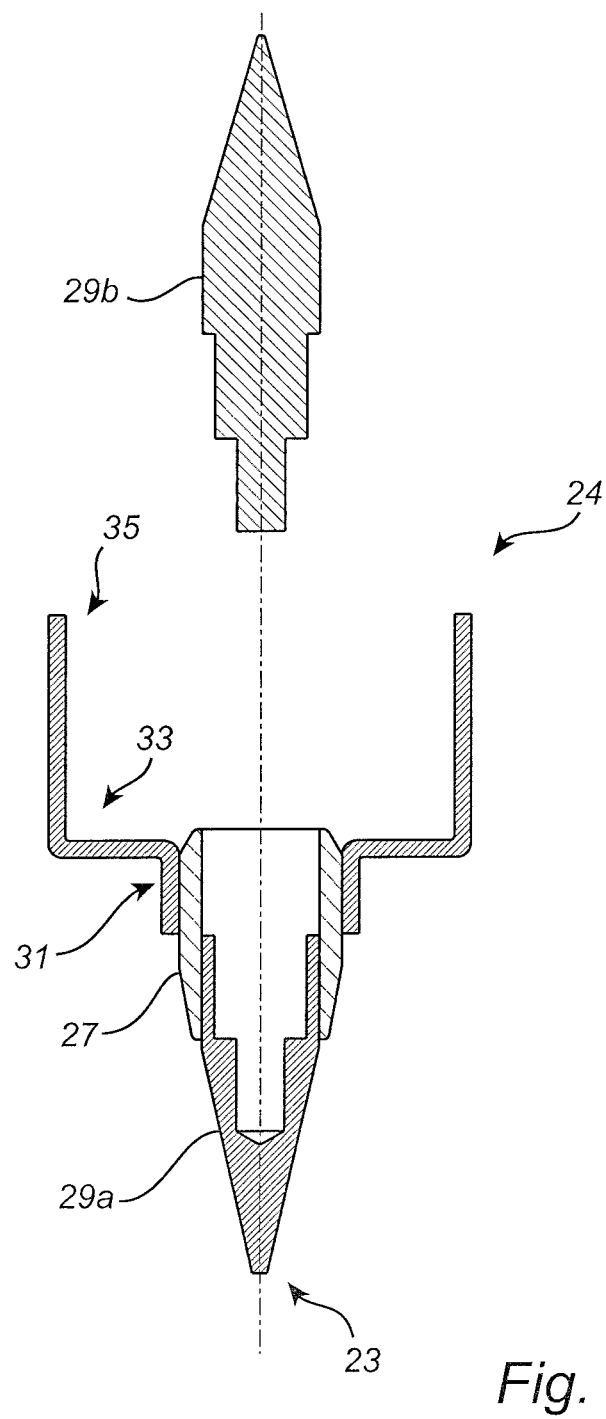
FIG. 5 is a schematic cross-section view of a first example configuration of the sealing arrangement included in the feed-through in FIG. 4.

Referring to FIG. 5, which is a schematic cross-section view of the sealing arrangement 24 included in the feed-through 15 in FIG. 4, the above-mentioned portion of the hollow conductor 25 is constituted by an inner circumferential portion 31 of a metallic sealing member 33, which also includes an outer circumferential portion 35. The elongated plug 23 indicated in FIG. 4 comprises a non-conductive sleeve member 27, and a metallic plug member 29 comprising a first part 29a and a second part 29b. The non-conductive sleeve member 27, which is here provided in the form of a ceramic sleeve made of ZTA (zirconia toughened alumina) is sealingly joined to the inner circumferential portion 31 of the metallic sealing member 33, and to the first part 29a of the metallic plug member 29, by brazing, to thereby provide a temperature resistant high pressure tank seal in the feed-through 15. The second part 29b of the metallic plug member 29 can be attached to the first part 29a of the metallic plug member 29 to make electrical conductive contact with the first part 29a. As is schematically indicated in FIG. 4, and as will be described in more detail further below, the outer circumferential portion 35 of the metallic sealing member 33 is sealingly joined to the first gauge part 16 by continuous welding.

Figure 6C:
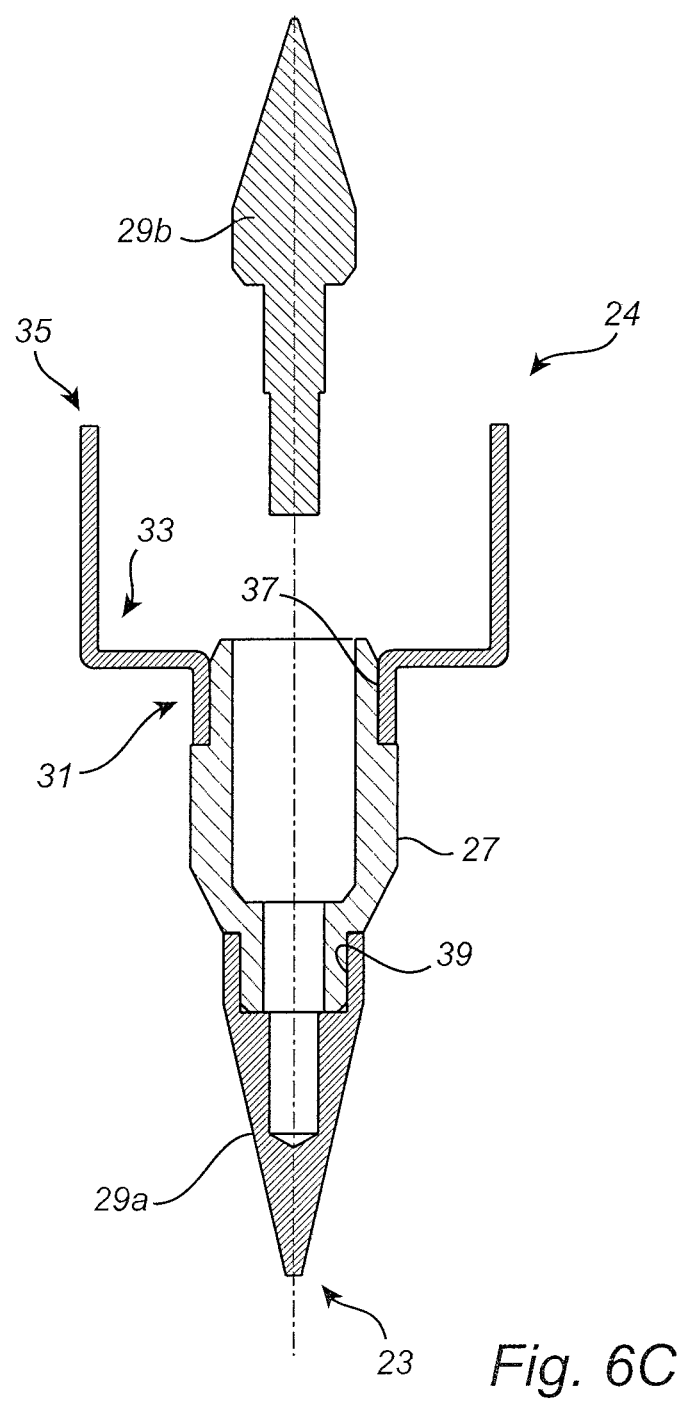

FIGS. 6A-C schematically illustrate other example configurations of the sealing arrangement 24 that may be included in various embodiments of the radar level gauge system 2 according to the present invention.

Referring first to FIG. 6A, the sealing arrangement 24 mainly differs from the sealing arrangement configuration in FIG. 5 in that the outer circumferential portion 35 of the metallic sealing member 33 is in substantially the same plane as the inner circumferential portion 31, and in that the metallic plug member 29 is provided as a single piece, and not as two separate pieces that can be joined together. The configuration of the sealing arrangement in FIG. 6A may facilitate welding of the outer circumferential portion 31 to the first gauge part 16 (or to the second gauge part 18). The gauge parts may need to be adapted to a different configuration of the metallic sealing member 33.

Turning to FIG. 6B, the metallic sealing member 33 has been configured to fulfill the additional functionality of the antenna 5 (or antenna adapter). This configuration of the metallic sealing member may provide for a reduction in the number of parts of the radar level gauge system 2, and may thus potentially provide for a reduction in the production cost.

In the example configuration in FIG. 6C, the first sealing joint 37 between the ceramic sleeve member 27 and the inner circumferential portion 31 of the metallic sealing member 33 and the second sealing joint 39 between the ceramic sleeve member 27 and the first metallic pin part 29a are both on the outer surface of the ceramic sleeve member 27. This may provide for a more rational process of forming the first 37 and second 39 sealing joints, for example by brazing.

Although various embodiments have now been described in which the elongated plug 23 is sealingly joined to a metallic sealing member 33, and the inner circumferential portion 31 of the metallic sealing member 33 constitutes a portion of the hollow conductor 25 in the feed-through 15, it should be noted that the elongated plug 23 may alternatively be sealingly joined directly to, for example, the first gauge part 16 or the second gauge part 18.

Figure 7:
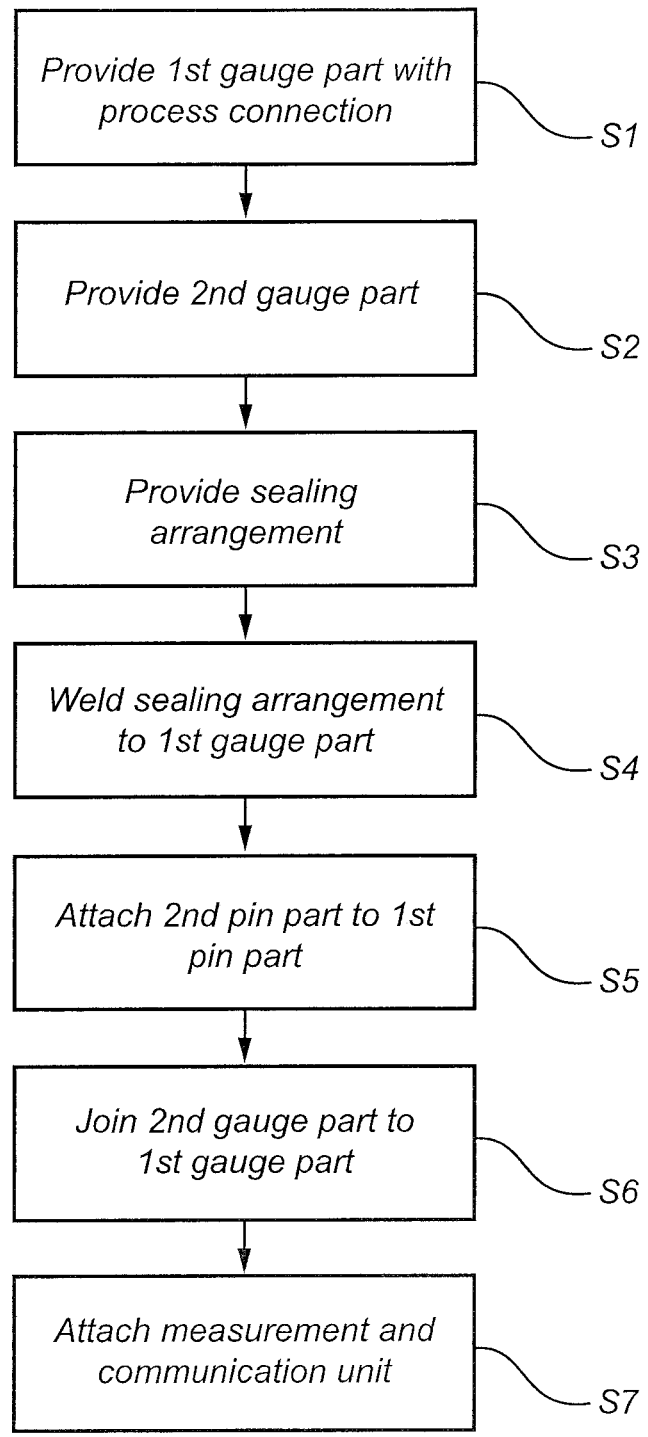
FIG. 7 is a flow-chart schematically illustrating a manufacturing method according to an embodiment of the present invention.

An embodiment of the method according to the invention of manufacturing the feed-through will be described below with reference to the flow-chart in FIG. 7 and the schematic illustrations in FIGS. 8A-B.

Figure 8A:
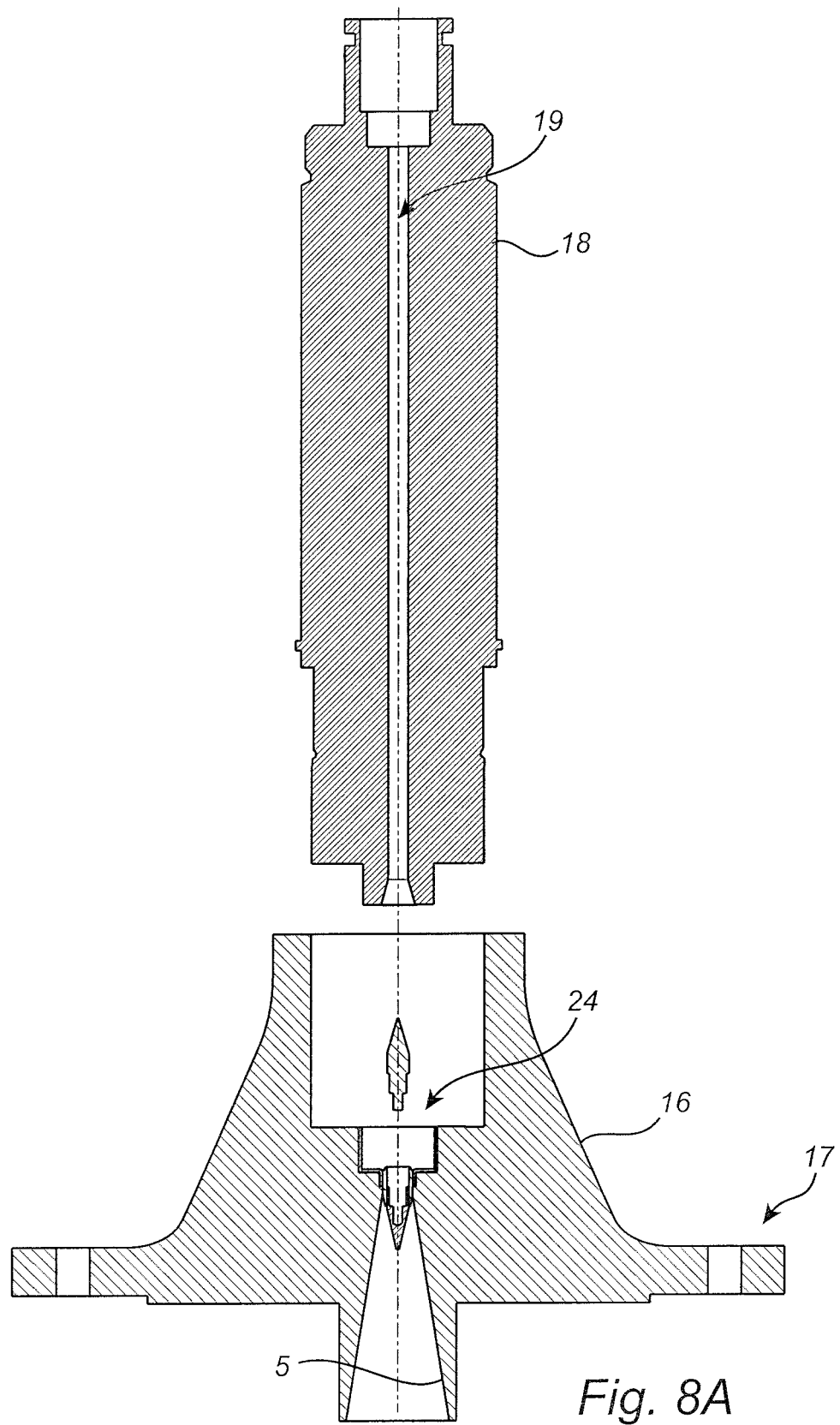
FIGS. 8A-B are schematic illustrations of the method according to FIG. 7.
Figure 8B:
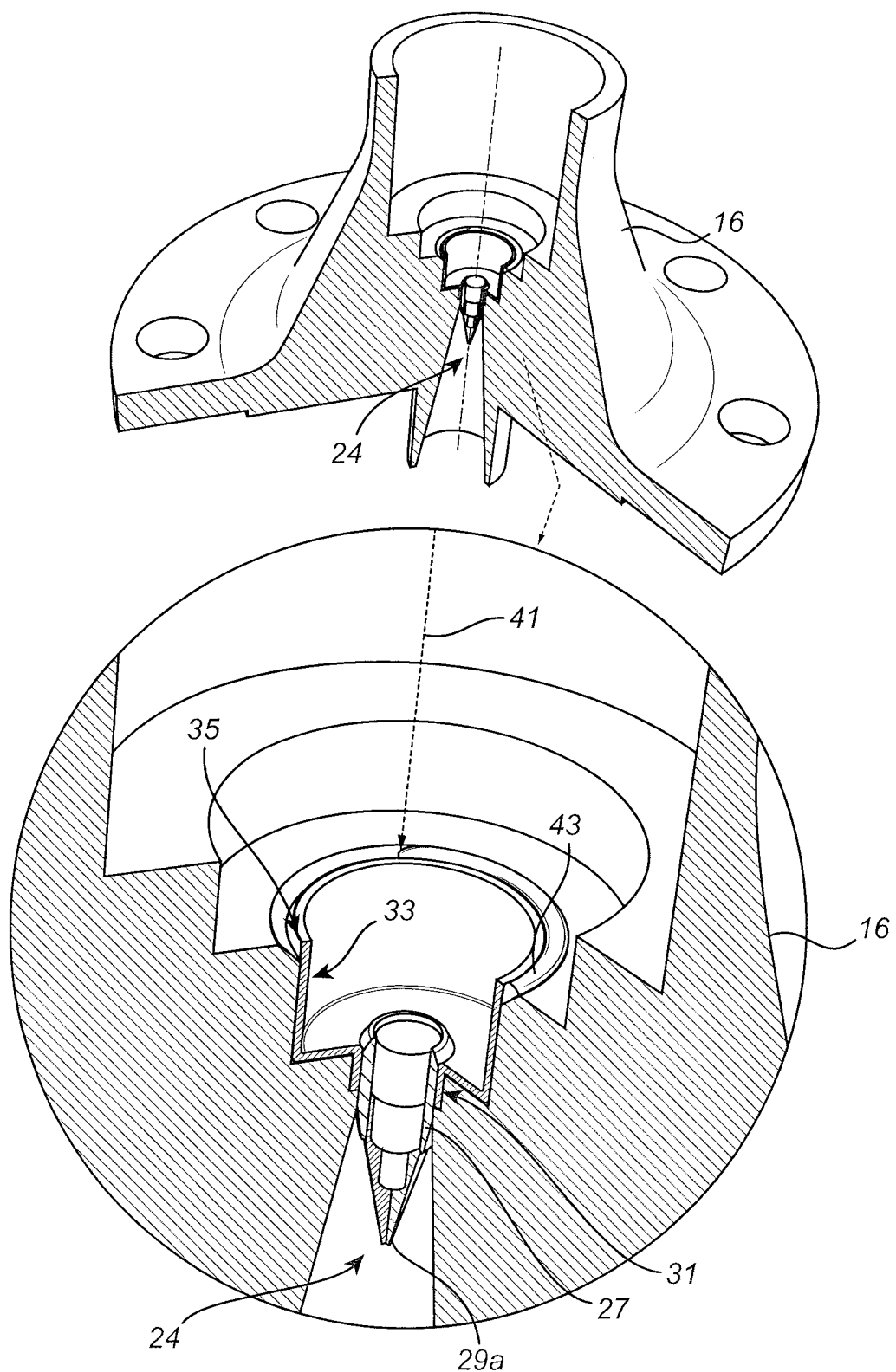

In a first step S1, also referring to FIG. 8A, a first gauge part 16 is provided. In this example embodiment, the first gauge part 16 includes a process connection in the form of a flange. The first gauge part 16 also includes an upper part of the antenna 5.

In a second step S2, a second gauge part 18 is provided. The second gauge part 18 is configured to be joined to the first gauge part 16, for example by a nut 22 as indicated in FIG. 3. The second gauge part 18 includes a waveguide 19 for guiding microwave signals between the transceiver (in the measurement and communication unit 13 shown in FIG. 3) and the antenna 5. In the example embodiment of FIG. 8A, the second gauge part 18 is relatively long, in order to distance the components in the measurement and communication unit 13 from the heat inside the tank 7.

In a third step S3, a partial sealing arrangement 24 is provided, in the example configuration described above in connection with FIG. 5. The first pin part 29a is brazed to the ceramic sleeve member 27, which is in turn brazed to the inner circumferential portion 31 of the metallic sealing member 33.

In the subsequent step S4, the partial sealing arrangement 24 is inserted in the first gauge part 16, and the outer circumferential portion 35 of the metallic sealing member 33 is welded to the first gauge part 16. This is schematically indicated in FIG. 8B by laser beam 41. As a result of the welding operation, a circumferential weld 43 is formed. The ceramic-metal interfaces between the ceramic sleeve member 27 and the inner circumferential portion 31 of the metallic sealing member 33, and the first pin part 29a, respectively, and this weld 43 form part of a gas tight seal of the feed-through 15.

In the next step S5, the second pin part 29b is attached to the first pin part 29a, to achieve an electrically conductive contact between the first pin part 29a and the second pin part 29b.

Thereafter, in step S6, the first gauge part 16 and the second gauge part 18 are joined together, and, finally, in step S7, the measurement and communication unit 13 is attached to the top of the second gauge part 18 to form the finished radar level gauge system 2 in FIG. 3.

The person skilled in the art realizes that the present invention by no means is limited to the preferred embodiments described above. On the contrary, many modifications and variations are possible within the scope of the appended claims.

What is claimed is:

1. A radar level gauge system for determining the filling level of a product in a tank, comprising:
  a transceiver for generating, transmitting and receiving electromagnetic signals in a frequency range having a center frequency;
  an antenna for radiating an electromagnetic transmit signal from said transceiver towards a surface of the product and for returning an electromagnetic reflection signal resulting from reflection of the electromagnetic transmit signal at the surface back towards said transceiver;
  a feed-through connecting said transceiver and said antenna; and
  processing circuitry coupled to said transceiver for determining said filling level based on a relation between said transmit signal and said reflection signal,
  wherein said feed-through comprises a waveguide arranged between said transceiver and said antenna to receive said transmit signal from said transceiver and guide said transmit signal towards said antenna in a guiding direction, said waveguide comprising an elongated plug arranged in a hollow conductor extending in said guiding direction,
  wherein said elongated plug comprises a non-conductive sleeve member and a metallic plug member, said non-conductive sleeve member being sealingly joined to a portion of said hollow conductor and to said metallic plug member.

2. The radar level gauge system according to claim 1, wherein said non-conductive sleeve member is arranged to electrically conductively separate said hollow conductor and said metallic plug member.

3. The radar level gauge system according to claim 1, wherein said non-conductive sleeve member is made of a ceramic material.

4. The radar level gauge system according to claim 1, wherein:
  an inner surface of said non-conductive sleeve member is sealingly joined to said metallic plug member; and
  an outer surface of said non-conductive sleeve member is sealingly joined to the portion of said hollow conductor.

5. The radar level gauge system according to claim 1, wherein a maximum dimension, in a direction perpendicular to said guiding direction, of said metallic plug member is at least one half of a maximum dimension, in the direction perpendicular to said guiding direction, of said non-conductive sleeve member.

6. The radar level gauge system according to claim 1, wherein said hollow conductor has a substantially circular cross-section, in respect of a plane perpendicular to said guiding direction.

7. The radar level gauge system according to claim 1, wherein said non-conductive sleeve member is joined to said metallic plug member in such a way that a physical or chemical bond is formed between said non-conductive sleeve member and said metallic plug member.

8. The radar level gauge system according to claim 1, wherein said non-conductive sleeve member is joined to said metallic plug member by brazing.

9. The radar level gauge system according to claim 1, wherein said non-conductive sleeve member is joined to the portion of said hollow conductor in such a way that a physical or chemical bond is formed between said non-conductive sleeve and the portion of said hollow conductor.

10. The radar level gauge system according to claim 1, wherein said non-conductive sleeve member is joined to the portion of said hollow conductor by brazing.

11. The radar level gauge system according to claim 1, wherein said radar level gauge system comprises:
  a first gauge part and a second gauge part joined to said first gauge part; and
  a metallic sealing member including:
    an inner circumferential portion constituting the portion of said hollow conductor; and
    an outer circumferential portion sealingly joined to said first gauge part.

12. The radar level gauge system according to claim 11, wherein the outer circumferential portion of said metallic sealing member is sealingly joined to said first gauge part by welding.

13. The radar level gauge system according to claim 11, wherein said outer circumferential portion is spaced apart from said inner circumferential portion in said guiding direction.

14. The radar level gauge system according to claim 11, wherein said outer circumferential portion extends in said guiding direction.

15. The radar level gauge system according to claim 1, wherein said metallic plug member comprises:
a first part sealingly joined to said non-conductive sleeve member; and
a second part attached to said first part in such a way that said second part is electrically conductively connected to said first part.

16. The radar level gauge system according to claim 15, wherein said first part faces said antenna, and said second part faces said transceiver.

17. The radar level gauge system according to claim 1, wherein said center frequency is higher than 20 GHz.

18. The radar level gauge system according to claim 1, wherein said antenna is a horn antenna.

19. The radar level gauge system according to claim 1, wherein said non-conductive sleeve member and said metallic plug member extend into said antenna.

20. A method of manufacturing a radar level gauge system, comprising the steps of:
providing a first gauge part;
providing a second gauge part configured to be joined with said first gauge part;
providing a sealing arrangement comprising:
a metallic sealing member having an inner circumferential portion and an outer circumferential portion; and
an elongated plug sealingly joined to the inner circumferential portion of said metallic sealing member;
attaching said sealing arrangement to said first gauge part by sealingly joining the outer circumferential portion of said metallic sealing member to said first gauge part; and
joining said first gauge part and said second gauge part.

21. The method according to claim 20, wherein said step of attaching comprises welding the outer circumferential portion of said metallic sealing member to said first gauge part.

22. The method according to claim 20, wherein:
said plug comprises a metallic plug member, and non-conductive member sealingly joined to said metallic plug member and to the inner circumferential portion of said metallic sealing member.

23. The method according to claim 22, wherein:
said metallic plug member comprises:
a first pin part sealingly joined to said non-conductive sleeve member; and
a second pin part,
the method further comprising the step of:
attaching said second pin part to said first pin part in such a way that said second pin part is conductively connected to said first pin part.

24. The method according to claim 23, wherein said step of attaching said second pin part to said first pin part takes place after the step of attaching said sealing arrangement to said first gauge member.

25. The method according to claim 20, wherein:
said first part is one of a measurement electronics member including a transceiver for generating, transmitting and receiving electromagnetic signals, and a tank-mounting member for attachment to said tank; and
said second part is the other one of the measurement electronics member including a transceiver for generating, transmitting and receiving electromagnetic signals, and the tank-mounting member for attachment to said tank.

\* \* \* \* \*